United States Patent
Thurow et al.

(10) Patent No.: US 6,817,597 B1
(45) Date of Patent: Nov. 16, 2004

(54) SPRING-AND-SHOCK ABSORBER SYSTEM HAVING DIFFERENTIAL ROLL BELLOWS

(75) Inventors: Gerhard Thurow, Garbsen (DE); Martin Winkler, Schwaikheim (DE); Bernd Acker, Esslingen (DE); Christoph Bank, Lehrte (DE); Paul Cerny, Wennigsen (DE); Peter Gönnheimer, Weinstadt (DE); Hans-Peter Klander, Esslingen (DE); Darko Meljnikov, Leinfelden-Echterdingen (DE); Matthias Römer, Altdorf (DE); Karl-Heinz Röss, Ebersbach (DE); Rüdiger Rutz, Köngen (DE)

(73) Assignees: DaimlerChrysler AG, Stuttgart (DE); ContiTech Luftfedersysteme GmbH, Hannover (DE)

(*) Notice: Subject to any disclaimer, the term of this patent is extended or adjusted under 35 U.S.C. 154(b) by 0 days.

(21) Appl. No.: 10/069,661

(22) PCT Filed: Aug. 23, 2000

(86) PCT No.: PCT/EP00/08233
§ 371 (c)(1),
(2), (4) Date: Jun. 24, 2002

(87) PCT Pub. No.: WO01/14765
PCT Pub. Date: Mar. 1, 2001

(30) Foreign Application Priority Data

Aug. 24, 1999 (DE) .......................... 199 39 969
May 19, 2000 (DE) .......................... 100 24 571

(51) Int. Cl.$^7$ .................................. F16F 9/05
(52) U.S. Cl. .................. 267/122; 267/64.21; 267/64.24
(58) Field of Search .................... 267/122, 123, 267/64.14, 64.21, 64.23, 64.24, 64.25, 64.26, 64.27

(56) References Cited

U.S. PATENT DOCUMENTS 4,493,481 A  1/1985  Merkle
4,518,154 A * 5/1985  Merkle .................... 267/64.24

(List continued on next page.)

FOREIGN PATENT DOCUMENTS

| DE | 27 59 435 | 10/1979 |
| DE | 29 07 926 | 9/1980 |
| DE | 41 08 711 | 9/1992 |
| DE | 195 46 645 | 6/1996 |

(List continued on next page.)

OTHER PUBLICATIONS

"Producing a smoother car ride over the cobbles—A low bandwidth active suspension system for application to luxury motor vehicles has been developed from parts manufactured using proven automotive technology," *Design Engineering*, vol. 232, p. 25, (London, UK, Jan. 1994).

*Primary Examiner*—Matthew C. Graham
(74) *Attorney, Agent, or Firm*—Kenyon & Kenyon

(57) ABSTRACT

A combined spring-and-shock-absorber system for supporting wheel suspensions or axles on a vehicle body has a tubular roll bellows (U-bellows) arranged between a wheel-bearing or wheel-controlling connection and a connection on the vehicle body side, the bellows being arranged between an outer bell and a rolling piston, the outer bell and the rolling piston, in each case, having at least partially varying diameters over the height of the corresponding component, and having walls that contact the tubular roll bellows. Both ends of the tubular roll bellows being sealingly secured on the rolling piston at segments having different diameters, the lower mounting section having a larger diameter than the upper mounting section. For this purpose, a tubular roll bellows is used, which is configured as a differential roll bellows, whose interior is filled with a fluid and communicates with a hydraulic accumulator supported on the chassis and/or vehicle body. On the basis of the present invention, a combined spring-and-shock-absorber system is developed, which contains a friction-free displacement device in a thin construction.

15 Claims, 3 Drawing Sheets

U.S. PATENT DOCUMENTS

| | | | | |
|---|---|---|---|---|
| 4,555,096 A | * | 11/1985 | Pryor | 267/64.21 |
| 5,180,145 A | * | 1/1993 | Watanabe et al. | 267/64.24 |
| 5,477,946 A | * | 12/1995 | Kawamata et al. | 188/267 |
| 5,570,866 A | | 11/1996 | Stephens | |

FOREIGN PATENT DOCUMENTS

| | | |
|---|---|---|
| DE | 196 22 573 | 12/1996 |
| DE | 297 02 927 | 7/1997 |
| DE | 199 52 799 | 5/2000 |
| GB | 2 318 851 | 5/1998 |

* cited by examiner

SPRING-AND-SHOCK ABSORBER SYSTEM HAVING DIFFERENTIAL ROLL BELLOWS

FIELD OF THE INVENTION

The present invention relates to a combined spring-and-shock-absorber system for supporting wheel suspensions or axles on a vehicle body using a tubular roll bellows (U-bellows) arranged between a wheel-bearing or wheel-controlling connection and a connection on the vehicle body side, the bellows being arranged between an outer bell and a rolling piston, the outer bell and the rolling piston, in each case, having at least partially varying diameters over the height of the corresponding component, and having walls that contact the tubular roll bellows. Both ends of the tubular roll bellows are sealingly secured on the rolling piston at segments having different diameters, the lower mounting section having a larger diameter than the upper mounting section.

BACKGROUND INFORMATION

U.S. Pat. No. 4,518,154, describes a conventional pneumatic suspension system for vehicles. The outer bell and the multi-part rolling piston enclose a unitary differential roll bellows. Due to the low gas pressure and the use of a differential roll bellows, this design may require an installation space of an excessively large volume.

In addition, German Published Patent No. 297 02 927 describes a conventional spring-and-shock-absorber system, which is composed of a displacement device without a bellows, a hydraulic accumulator, and a hydraulic line connecting these parts. In the hydraulic line, a mechanical choker valve is arranged. The displacement device, as is conventional in a hydropneumatic suspension system, connects the vehicle wheel suspension to the vehicle body. The system is filled with a hydraulic fluid. The latter, when a vehicle wheel is spring deflected, is forced through the choker valve into a hydraulic accumulator. The flow resistance of the choker valve generates a damping force, whereas the compression of the gas volume in the hydraulic accumulator creates a spring force. In accordance with the principle of displacement presented here, a displacement piston plunges into a displacement cylinder. Both parts move in a guiding and sealing interaction, generating friction against each other. The friction impairs the response time of the spring-and-shock-absorber system, so that when it is used in a vehicle, the driving comfort of wheels supported by this system may not be optimal.

U.S. Pat. No. 4,493,481 depicts a pneumatic spring for motor vehicles having a closed spring volume and two effective, changeable spring surfaces, whose sizes are a function of the spring elongation, and which are supported in a coaxial manner against each other, the spring surfaces being of different sizes, mutually acted upon by pressure, and facing away from each other. The tubular roll bellows is secured on both ends, having the same diameters, on the rolling piston and is configured as a one-piece tubular roll bellows.

In British Published Patent No. 2,318,851, a multi-bellows spring system having hydraulic accumulators connected by lines is described. Two separate, enclosed bellows, that are different in size, have each available to it its own hydraulic accumulator. These are two systems that are separated from each other hydraulically, each bellows, viewed in the spring direction, on the chassis side and on the wheel-controlling side, having the same piston surfaces. The bellows are essentially freestanding bellows, whereas in the exemplary embodiments according to the invention, the bellows are supported over virtually the entire area between an outer bell and a rolling piston. Between the bellows, there is a mechanical transmission element that is independent of the bellows.

As described in numerous publications and from practice, conventional diverse motor vehicle air suspension systems are essentially composed of a roll bellows that encloses a volume of air and that is bordered on its one end by a chassis-fixed covering plate and on its other end by a wheel-side rolling piston. Conventional air spring systems of this type may lack stability with regard to tilting, so that additional measures may be required for the longitudinal and transverse guiding functions.

SUMMARY OF THE INVENTION

The present invention concerns the development of a combined spring-and-shock-absorber system, which contains a low-friction, thin-design displacement device that is based on a tubular roll bellows and that has great transverse rigidity. In addition, an objective of the present invention may include creating a suspension device that is acted upon by a pressure medium, the device being controllable with regard to suspension performance and the height of the spring, and it being such that it is completely or at least substantially possible to do without external longitudinal and transverse suspension links.

According to one exemplary embodiment and/or exemplary method of the present invention, a tubular roll bellows may he used, which may be configured as a differential roll bellows, whose interior may be filled with a fluid and may communicate to a hydraulic accumulator that is supported on the chassis or on the vehicle side.

The type of displacement bellows, the type of connection on the chassis and on the vehicle body, and the possibility that the bellows interior may be filled with a fluid that is prestressed using a gas make possible a slim displacement device that does not have a mechanical, friction-producing longitudinal guide element. A separate longitudinal guide element may be superfluous because the pressure in the displacement bellows, as a result of the two bellows meniscuses, centers and stabilizes the shock-absorber leg parts, which move relative to each other.

In response to a pressurizing or depressurizing of the displacement device, a hydraulic fluid flows back and forth between the displacement device and the hydraulic accumulator via a narrowing of the cross-section in the form of a hydraulic line or an opening. The configuration of the line, or the opening, and the characteristics of the restrictors arranged there influence the system dampening in accordance with the size and shape of the opening cross-section. In this context, the individual restrictor may be configured either as a nozzle or an aperture, or at least as a one-way restrictor. When one-way restrictors are used, at least one valve for each flow direction may be arranged in the cross-section of the line, or the opening.

The gas cushion of the hydraulic accumulator normally constitutes the suspension system.

As a result of using a tubular roll bellows in the form of a differential roll bellows, the mechanical friction of the entire system may be essentially reduced to the interior friction of the bellows or membrane material. As a result, the spring-and-shock-absorber system may demonstrate virtually ideal responsiveness over the entire range of damping rates. The outer bell and/or the rolling piston may each be directly secured—even without the interposition of rubber-elastic elements—on the vehicle body, or on the chassis, via flexible couplings. This may reduce, inter alia, the component weight, the manufacturing costs, the difficulty of assembly, and maintenance costs.

Both rolling piston halves, in addition to the two corresponding halves of the differential roll bellows in the suspension device according to the present invention, provide a self-centering guide function between the double rolling piston and the outer bell. On account of the relatively high operating pressure—in comparison to conventional air suspension systems—this radial guidance may be especially stable.

On the other hand, due to the rubber-elastic decoupling of piston and outer bell, the excitation of higher-frequency vibrations may be filtered out. The shape of the suspension device as a differential roll bellows may be oblong, which, in addition to the very good radial (lateral) guidance, also provides very good longitudinal guidance. For this reason, it is possible, substantially or even entirely, to dispense with a separate longitudinal and transverse control arm.

The spring force is determined by the difference in the effective radii of curvature of the two roll bellows halves (differential roll bellows halves). The radii of curvature of the roll bellows halves are produced by the differences in the radii (or diameters) of the outer bell and the two piston (halves). If the difference between the individual piston radii is slight, then the difference in the radii of curvature of the roll bellows halves may also be slight. This has the consequence that it is possible to operate at a high operating pressure, as may be required in active chassis control systems.

The difference in the effective roll-bellows radii of curvature, instead of using a difference in the piston radii, may be realized using a radius difference of the effective outer-bell segments.

The roll bellows halves, arranged so as to be opposite each other, are clamped, on one side, to the outer bell and, on the other side, to the piston using clamping rings so as to be fixed in a mechanically reliable fashion and tight in the pneumatic/hydraulic sense.

The filling of the spring and the control system, specifically setting the spring level, but also controlling the rolling motion, may be carried out using a controlled pressure pump, which may be connected to the tubular connectors located on the outer bell. In addition, an accumulator volume may also be connected.

For receiving a shock absorber, the piston may be configured so as to be a hollow cylinder. In this manner, it is possible to do without a separately arranged shock absorber. This may save both additional installation space as well as additional assembly work. The shock absorber, surrounded by the spring sleeve, may be protected from road impurities.

The spring volume of the roll bellows halves may alternatively be filled with a compressed gas (such as, for example, air) or with a hydraulic fluid.

DETAILED DESCRIPTION

Figure 1:
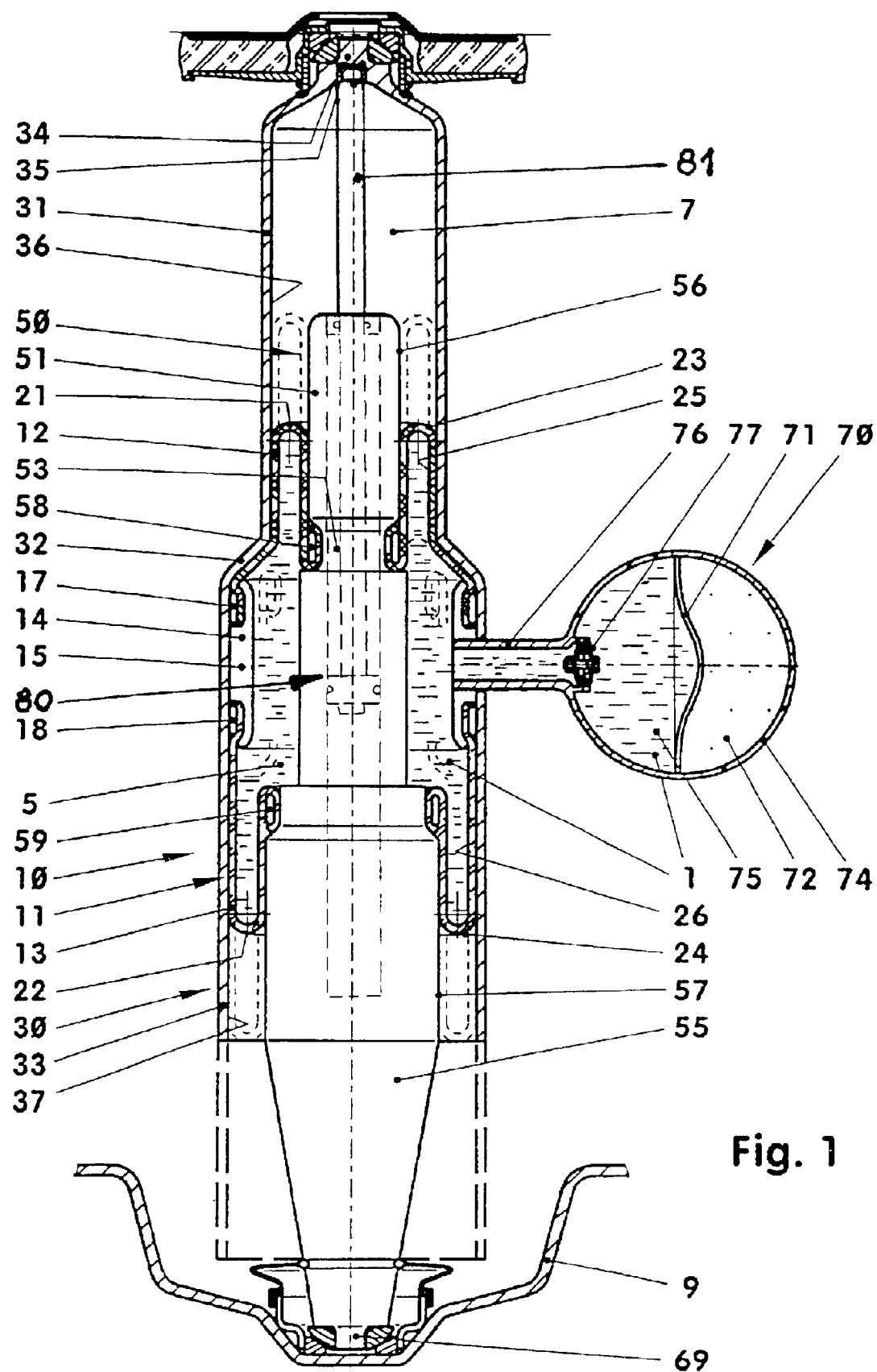
FIG. 1 shows a spring-and-shock-absorber system having a differential roll bellows and an external hydraulic accumulator.
Figure 2:
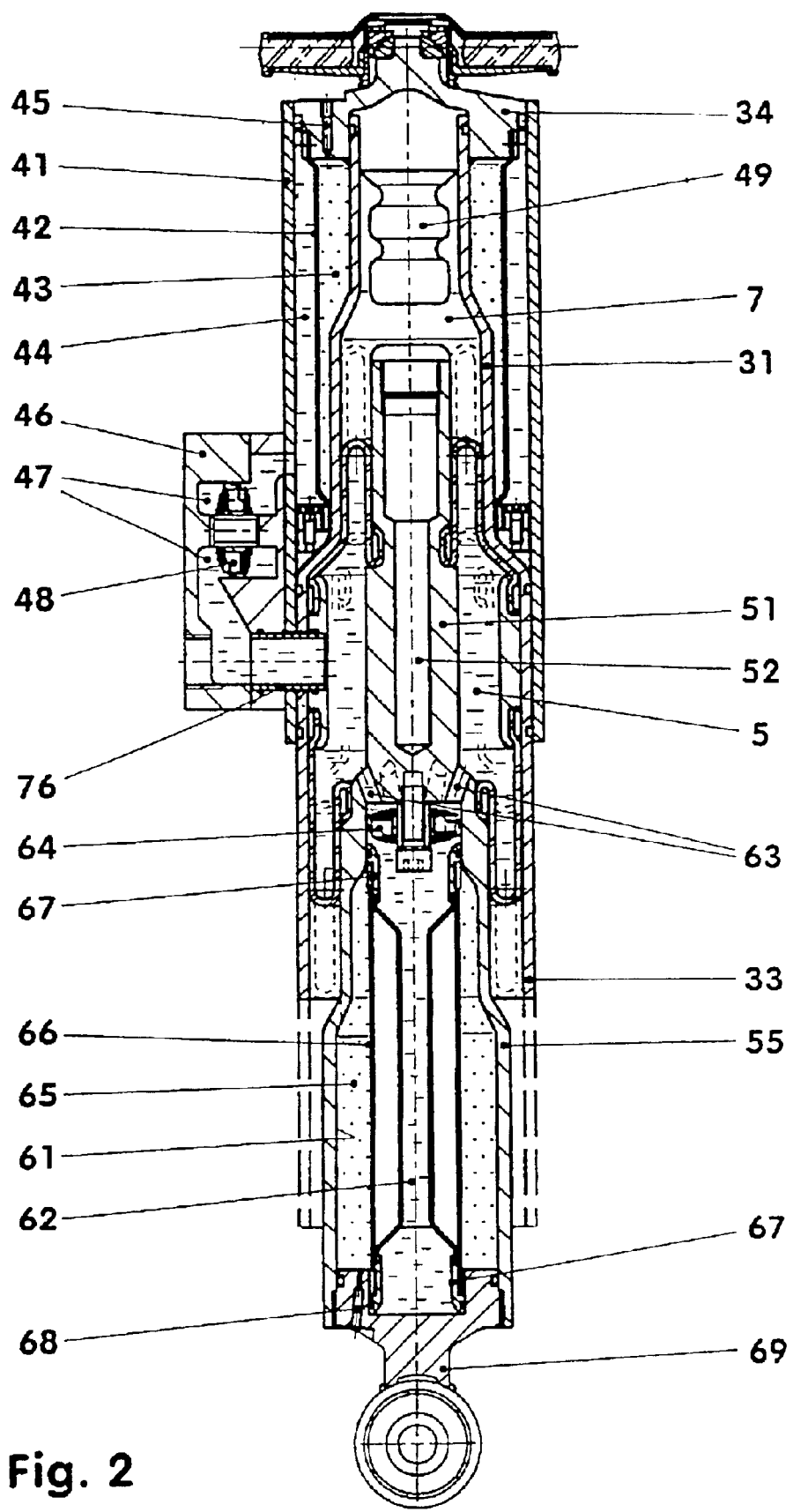
FIG. 2 shows a spring-and-shock-absorber system having an integrated hydraulic accumulator.

FIGS. 1 and 2 each depict a combined spring-and-shock-absorber system, which includes a displacement device (10), a hydraulic accumulator (70, 44, 62), and a fluid-containing working line (76), arranged between the latter and having an integrated choker valve (77, 48, 64).

The displacement device (10) is composed, inter alia, of a multi-stage outer bell (30), an also multi-stage rolling piston (50), and a multi-part differential roll bellows (11), connecting both elements. In response to a spring deflection and rebound, rolling piston (50), secured, for example, on the chassis, moves up and down, centeringly guided by differential roll bellows (11). In this context, exterior wall (23, 24) of differential roll bellows (11) rolls on outer bell (30) and on rolling piston (50).

Outer bell (30) is a hollow body, which contains here two at least partially cylindrical segments (31, 33), which are connected to each other by a transition piece (32) in the shape of a truncated-cone sleeve. In FIG. 1, segments (31, 32) and transition piece (33) are made of one part. Upper segment (31) is closed at its upper end by a plate (34). On plate (34), an adapter (35) is formed for the articulated connection to the vehicle body. The interior diameter of the upper, cylindrical segment (31) is, for example, one third smaller than the interior diameter of lower, cylindrical segment (33).

Segments (31) and (33) may also have an interior contour in the shape of a truncated cone. In a case of this type, upper segment (31) would taper towards the top and lower segment (33) would taper towards the bottom.

Rolling piston (50) also has an upper (51) and a lower segment (55), both segments (51, 55) having, for example, a cylindrical outer shape (56, 57). The exterior diameter of upper segment (51) is smaller than the exterior diameter of segment (55). The exterior diameter of segment (51) is, for example, roughly 60% of the interior diameter of outer-bell segment (31). The diameter differential in the exemplary embodiment is selected so that, in each case, the gap between segments (31) and (51), opposite each other, is roughly the same width in the zones in which meniscuses (21, 22) of differential roll bellows (11) move.

In FIG. 1, lower segment (55) of rolling piston (50) is tapered. The tapering begins below the zone which may be contacted by differential roll bellows (11). The lower end of rolling piston (50) ends in an adapter (69) for the articulated connection to chassis (9).

Differential roll bellows (11), arranged between rolling piston (50) and outer bell (30), is composed, inter alia, of two potentially identical tubular roll-bellows halves (12, 13). Roll bellows halves (12, 13) are oriented in a coaxial manner with respect to each other and are mounted on each other in a gas- and fluid-tight manner via a roughly tubular connecting sleeve (14). Connecting sleeve (14) is a short tube, onto which from both sides a roll-bellows half (12, 13) is slid. Each attached segment of corresponding roll-bellows halves (12, 13) is fixed in a non-skid manner on connecting sleeve (14) using a clamping ring (17, 18), for example, in a force- and form-locking manner. In FIGS. 1 and 2, the connecting sleeve between clamping rings (17, 18) has a tubular segment (15), which is not covered by roll-bellows halves (12, 13). This tubular segment (15) has an exterior diameter which is only slightly smaller than the interior diameter of lower segment (33) of outer bell (30).

To secure differential roll bellows (11) on rolling piston (50), the lower end of differential roll bellows (11), which is open at the tube ends, is slid on interior wall (26) onto the upper end of lower rolling piston segment (55) and is clamped securely using a clamping ring (59). Segment (55) has there a radius that is reduced by the sum of the wall thicknesses of clamping ring (58) and of bellows (11).

In a second step, rolling piston (50) is inserted into differential roll bellows (11), until the upper roll-bellows end reaches the middle of upper segment (51). During the insertion, the lower area of roll bellows (11) is turned back over clamping ring (59), so that exterior wall (24) of bellows (11) contacts rolling-piston segment (55).

In the center of upper segment (51) is located a recess (53), in which interior wall (25) of the upper end of bellows (11) is fixed using a clamping ring (58). The depth of recess (53) is chosen so that the exterior contour of mounted clamping ring (58) has approximately the same diameter as segment (51) in the zone, which, in the assembled state, exterior wall (24) of bellows (11) contacts. Beneath recess (53), in the exemplary embodiments, segment (51) has a diameter which is greater by roughly double the bellows wall thickness in comparison with the diameter of segment (51) above recess (53).

After the mounting of differential roll bellows (11) on rolling piston (50), both parts are inserted into outer bell (30), until connecting sleeve (14), having roll bellows half (12), contacts transition piece (32). For the final positioning of differential roll bellows (11), rolling piston (50) is pulled back into a central position within outer bell (30). In this context, as a meniscus (21) is formed having an upwards orientation, exterior wall (23) of roll bellows half (12) is turned back over clamping ring (58) and outer wall (56) of segment (51).

Consequently, in response to every operationally-caused relative motion between parts (30) and (50), exterior walls (23, 24) of differential roll bellows (11) roll on outer walls (56, 57) and inner walls (36, 37). Because in the exemplary embodiments, meniscuses (21, 22) of differential roll bellows (11) move in narrow annular spaces having cylindrical walls, the centering forces and the transverse rigidity are virtually constant over the entire stroke of the spring-and-shock-absorber leg.

Therefore, meniscuses (21, 22) in the entire stroke range move between rolling piston (50) and outer bell (30) in, for example, cylindrical zones. In this context, meniscus (21) realizes a piston surface, which is, for example, two-thirds smaller than the active piston surface on segment (55).

According to FIG. 1, the usable overall stroke of the shock absorber leg corresponds to roughly the interior diameter of outer bell (30) in the area of segment (33).

The lengths of individual roll-bellows halves (12) and (13) correspond, for example, to one-and-a-half to double the bellows diameter in the area of the segment (33).

Interior (5), enclosed by differential roll bellows (11), is filled with an incompressible fluid (1), which, according to FIG. 1, is under pressure by a gas cushion enclosed in a hydraulic accumulator (70). Hydraulic accumulator (70) is configured, for example, as a bubble or membrane accumulator. Gas cushion (72), divided by the bladder or membrane, constitutes the suspension unit of the spring-and-shock-absorber system.

Hydraulic accumulator (70), which is depicted in an arrangement next to outer bell (30) only by way of example, is connected to bellows interior (5) via a working line (76). For this purpose, working line (76) runs through outer-bell segment (33) and connects to connecting sleeve (14). In this way, working line (76) itself positions connecting sleeve (14) in outer-bell segment (33) in a form-locking manner.

In housing (74) of hydraulic accumulator (70), on the transition to working line (76), are located two operating pressure-stage valves, opposite each other, in the form of spring-plate valves (77). Each valve (77) opens in one flow direction. In this context, the choking effect of the individual throttle return valve (77) may be carried out so as to be adjustable, if necessary, using a drive that may be controlled or regulated.

If appropriate, a blockable supply line may be connected to working line (76). Assuming use as an active spring-and-shock-absorber system, or as a level regulator, fluid would be supplied or removed from the displacement device via a supply line of this type.

By supplying and removing a predetermined quantity of fluid, additional forces may be realized in an appropriate manner. The supplying or removal of these additional quantities changes the damping and the spring forces in the entire system.

Fluid (1), used in the spring-and-shock-absorber system, is, for example, a solution of water and alcohol. For this solution, all alcohols are appropriate which may be mixed at room temperature in any ratio with water. For example, a water-ethanol solution or a water-glycol solution may be used. A conventional water-glycol solution, which is also used as an anti-freeze coolant in internal combustion engines, may have, for example, an ethylene glycol component of 33 to 50%. Using a 50-percent solution, it may be possible to operate the spring-and-shock-absorber system down to a temperature of −35° Celsius. In addition, this solution may not corrode the usual elastomer materials. Furthermore, the rubber expansion is in the order of magnitude of the expansion in pure water.

FIG. 2 depicts a spring-and-shock-absorber system having two hydraulic accumulators, which are integrated in a space-saving manner. For this purpose, at least lower segment (55) of rolling piston (50) is configured as a hollow body, or a stepped blind-hole bore (61), having at least two hollow spaces (62) and (65), which are separated from each other. The hollow spaces, for this purpose, are arranged, for example, so as to be coaxial with respect to each other.

Exterior hollow space (65) is an annular space, which is formed by the interior wall of rolling piston (50) and a foliated tubular membrane (66). Tubular membrane (66), for this purpose, is fixed at the upper end by a ring adapter (67) in the area of the base of blind-hole bore (61) and at its lower end by a comparable ring adapter (67) in a base plate screwed into rolling piston (50). Annular space (65) is filled with gas via a valve (68) that is situated in this base plate.

Central hollow space (62) is in a hydraulic connection to bellows interior (5) via bore holes (63) and a double-acting leaf valve (64).

The second hydraulic accumulator is arranged in the area of upper outer-bell segment (31). For this purpose, outer bell (30) is surrounded here by, for example, a tubular housing (41). Between this housing (41) and the exterior contour of outer bell (30) is situated a general annular space, which is divided by a tubular membrane (42) into an inner (43) and outer annular space (44). Inner annular space (43) is filled with gas, see valve (45), whereas exterior annular space (44), comparable to fluid space (75) in FIG. 1, communicates with bellows interior (5) via at least one leaf valve (48). Leaf valve(s) (48) in the exemplary embodiments according to FIG. 2 are situated in a detachable housing (46). Interior space (47) of housing (46) is connected to bellows interior (5) via working line (76).

If appropriate, spaces (44) and (62) may also be hydraulically connected to each other directly and only communicate with bellows interior (5) via a double-acting leaf valve.

In contrast to FIG. 1, a rubber damping element (49), as an elastic limit stop, is located in deaerated return space (7). In addition, upper segment (51) of rolling piston (50) is furnished with a closed bore hole (52) to reduce the unsuspended mass.

Between the chassis and the vehicle body, the spring leg may also be arranged so as to have an outer bell attached in an articulated manner to the chassis. For this purpose, at least the contours of the rolling piston and the outer bell may be required to be adjusted to the new orientation of the rebound spring direction.

As an alternative to the exemplary embodiments described above, a spring-and-shock-absorber system is conceivable in which fluid (1) used in the system is a magneto-rheological fluid. If on hydraulic working line (76), for example, a short annular segment is surrounded by a current-excited solenoid coil, then the excited solenoid coil in combination with fluid (1) represents a variable restrictor. As the current supplied to the coil increases, the flow velocity decreases as a result of an increase in the apparent or dynamic viscosity in working line (76), as a result of which, inter alia, the damping performance of the entire system may be changed in a controlled manner.

Figure 3:
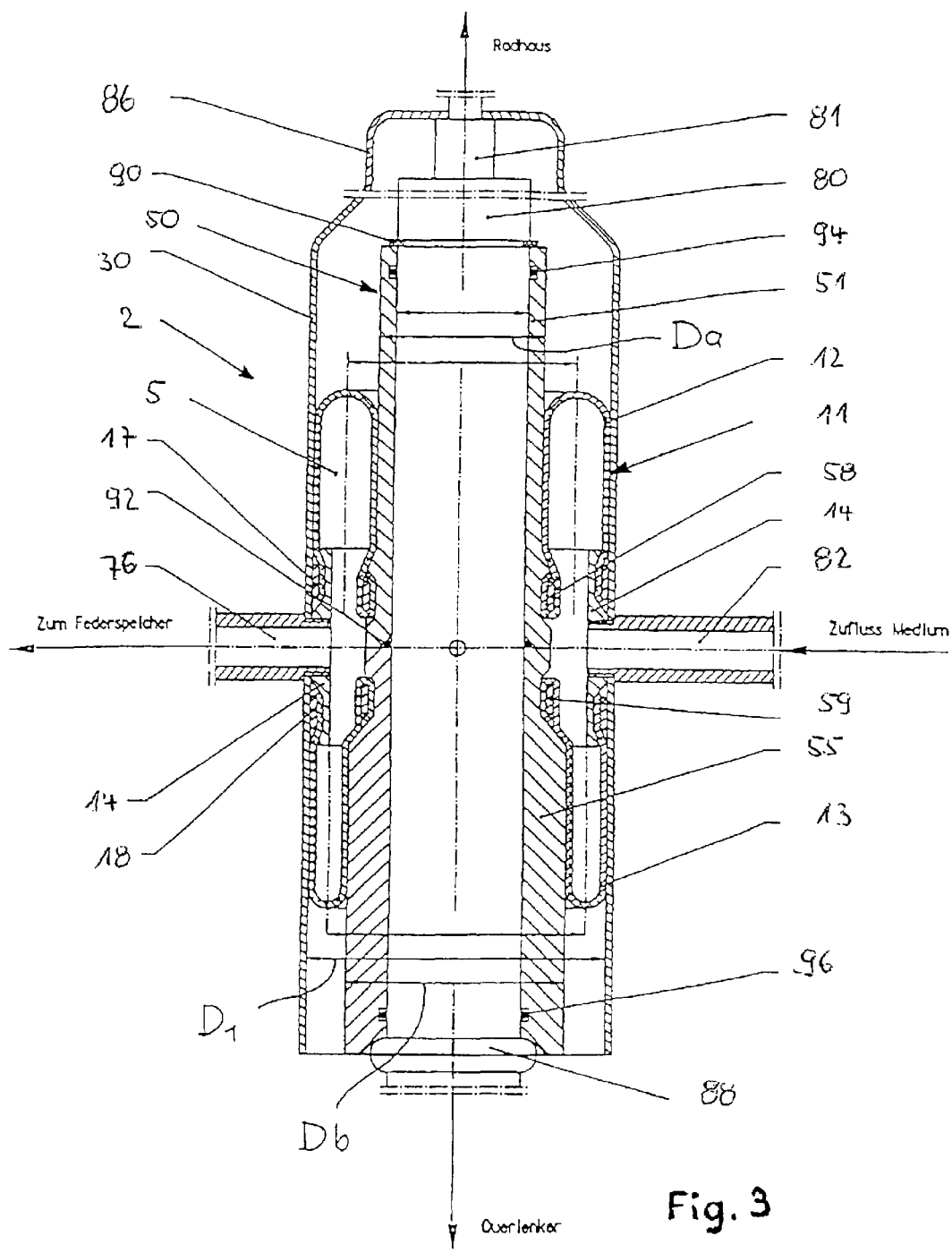
FIG. 3 shows a spring-and-shock-absorber system having a compressible gas (such as, for example, air) or hydraulic filling.

Suspension device (2) depicted in FIG. 3 is composed of an outer bell (30), which is configured in a cylindrical manner, and an interior piston (50). Piston (50), arranged so as to be co-axial with respect to outer bell (30), is configured as a double rolling piston. First (upper) partial piston (51) of double rolling piston (50) has exterior diameter (Da), whereas second (lower) partial piston (55) has exterior diameter (Db). Piston (50) made up of partial pistons (51) and (55), is axially movable within outer bell (30) having interior diameter ($D_1$).

Inside widths ($D_1$-Da) and ($D_1$-Db) between partial pistons (51) and (55) and outer bell (30) are filled by two roll-bellows halves (12) and (13), arranged opposite each other. Roll-bellows halves (12, 13) form a differential roll bellows (11) and are made of an elastomer material that is reinforced by a fabric insert. A (first) roll bellows (12) is assigned to one partial piston (51), whereas other (second) roll bellows (13) surrounds other partial piston (55). The ends of roll-bellows halves (12, 13) are clamped, on one side, on piston (50) using clamping rings (58, 59), and, on the other side, on outer bell (30) using an exterior ring (14) next to clamping rings (17, 18) in a pressure-tight manner. The exterior ring has two tubular connectors (76, 82) for connecting to a pump and to an accumulator (not depicted); the suspension device (2) may be controlled by tubular connectors (76, 82).

Piston (50), depicted in the drawing, is configured in a hollow cylindrical manner. Its interior contains a shock absorber (80), whose tube is secured on the upper piston end by a spring ring (90). The sealing tightness between shock absorber (tube) (80) and piston (50) is realized by three O-rings (92, 94, 96). Shock-absorber rod (81) is mounted on a covering plate (86) located on outer bell (30).

If piston (50), mounted on the wheel side, moves axially in relation to chassis-side outer bell (30), then both roll-bellows halves (12, 13), located between piston (50) and outer bell (30), roll, on one side, on the exterior surface of piston (50) and, on the other side, on the interior surface of outer bell (30). The axial force resulting from the application of pressure to roll-bellows halves (12, 13) using compressed air or hydraulic fluid, is proportional to the difference between the effective roll-bellows radii of curvature.

List of Reference Numerals 1 fluid, water-glycol solution
2 suspension device
5 bellows interior
7 return space
9 chassis
10 displacement device
11 tubular roll bellows, differential roll bellows, bellows
12,13 roll bellows halves, bellows parts
14 connecting sleeve
15 tubular segment
17,18 clamping rings
21,22 meniscuses
23,24 outer walls
25,26 inner walls
30 outer bell
31 upper segment
32 transitional piece
33 lower segment
34 base
35 adapter
36,37 interior walls
41 housing, tubular
42 membrane, hose-like
43 interior annular space
44 exterior annular space
45 valve
46 detachable housing
47 housing interior space
48 leaf valve
49 rubber damping element
50 rolling piston, piston
51 upper segment
52 bore
53 recess
55 lower segment
56,57 exterior walls
58,59 clamping rings
61 blind-hole bore
62 interior hollow space, central
63 bores
64 leaf valve
65 exterior hollow space, annular space
66 tubular membrane
67 ring adapter
68 valve
69 adapter, adapter having articulated joint
70 hydraulic accumulator
71 membrane
72 gas cushion
74 housing
75 fluid space
76 working line, tubular connector
77 choker valves, pressure stage valves
80 shock absorber
81 shock absorber rod
82 tubular connector, pump connection
86 cover, sleeve cylinder
88 extension of shock absorber tube
90 spring ring
92,94,96 O-ring
D1 interior diameter outer bell
Da exterior diameter first piston
Db exterior diameter second piston

What is claimed is:

1. A combined spring-and-shock-absorber system for supporting at least one of wheel suspensions and axles on a vehicle body, comprising:
   an outer bell;
   a rolling piston;
   a hydraulic accumulator that is supported on at least one of a chassis side and a vehicle body side; and
   a tubular roll bellows positioned between one of a wheel-bearing and wheel-controlling connection and a connection on a vehicle body side, the bellows being arranged between the outer bell and the rolling piston, the outer bell and the rolling piston each having at least partially varying diameters over a height of the respective component, the outer bell and the rolling piston each having walls that contact the bellows, ends of the tubular roll bellows being sealingly secured to the rolling piston at segments having different diameters, a lower mounting section of the bellows having a larger diameter than an upper mounting section of the bellows, the bellows having a bellows interior filled with a fluid, the bellows interior configured to communicate the fluid with the hydraulic accumulator.

2. The combined spring-and-shock-absorber system of claim 1, wherein the tubular roll bellows is a differential roll bellows having at least two parts.

3. The combined spring-and-shock-absorber system of claim 2, wherein ends of the at least two parts of the differential roll bellows face and connect to each other by a connecting sleeve.

4. The combined spring-and-shock-absorber system of claim 3, wherein the connecting sleeve has a working line that passes through the outer bell.

5. The combined spring-and-shock-absorber system of claim 1, wherein one of at least one restrictor and at least two throttle return valves is arranged in a fluid flow between the bellows interior and the hydraulic accumulator.

6. The combined spring-and-shock-absorber system of claim 1, wherein the fluid is a water-alcohol solution.

7. The combined spring-and-shock-absorber system of claim 1, wherein during travel operation of a vehicle, the bellows interior is connected to an external fluid supply via a supply line.

8. A combined spring-and-shock-absorber system for supporting one of wheel suspensions and axles on a vehicle body, comprising:
   an outer bell;
   a rolling piston;
   an accumulator having a volume; and
   a tubular roll bellows positioned between one of a wheel-bearing and wheel-controlling connection and a connection on the vehicle body side, the bellows being arranged between the outer bell and the rolling piston, the outer bell and the rolling piston each having at least partially varying diameters over a height of the respective component, the outer bell and the rolling piston each having walls that contact the bellows, ends of the bellows being sealingly secured on the rolling piston at segments having different diameters, a lower mounting section of the bellows having a larger diameter than an upper mounting section of the bellows, the bellows enclosing a bellows interior filled with a volume of gas, the bellows interior being controllably connected to the accumulator volume and to a pressure pump to communicate the gas therebetween via tubular connectors located in the wall of the outer bell.

9. The combined spring-and-shock-absorber system of claim 8, wherein:
   the tubular roll bellows includes two roll-bellows halves constituting a differential roll bellows;
   the rolling piston includes an upper segment and a lower segment constituting a differential rolling piston; and
   the roll-bellows halves of the differential roll bellows and the upper and lower segments of the differential rolling piston are arranged so as to be opposite each other.

10. The combined spring-and-shock-absorber system of claim 9, wherein the roll-bellows halves are configured to roll on interior surfaces of an upper and a lower segment of the outer bell and on exterior walls of the upper and lower segments of the rolling piston.

11. The combined spring-and-shock-absorber system of claim 10, wherein the exterior walls of the rolling piston and the interior surfaces of the outer bell are arranged such that the two roll-bellows halves, configured to roll between the rolling piston and the outer bell, have effective radii that are different from each other.

12. The combined spring-and-shock-absorber system of claim 8, wherein the upper segment of the rolling piston, assigned to a first roll-bellows half, has a different radius than the lower segment of the rolling piston, assigned to a second roll-bellows half.

13. The combined spring-and-shock-absorber system of claim 8, wherein the two roll-bellows halves are secured to the rolling piston and the outer bell in a pressure-tight manner using at least one of clamping rings and a connecting sleeve.

14. The combined spring-and-shock-absorber system of claim 8, wherein the rolling piston is configured in a hollow cylindrical fashion to receive a shock absorber, a first end of the shock absorber being mounted fixedly on a lower end of the rolling piston, and a second end of the shock absorber being secured fixedly on a covering plate located on the outer bell.

15. The combined spring-and-shock-absorber system of claim 8, wherein the rolling piston is configured in a hollow cylindrical fashion and is part of an enclosed shock absorber as a shock-absorber tube.

* * * * *